UNITED STATES PATENT OFFICE.

JOSEPH L. TURNER, OF PHILADELPHIA, PENNSYLVANIA, ASSIGNOR TO THE H. K. MULFORD COMPANY, OF PHILADELPHIA, PENNSYLVANIA, A CORPORATION OF PENNSYLVANIA.

PROCESS OF PREPARING ORGANIC IODIN COMPOUNDS.

1,016,799.   Specification of Letters Patent.   Patented Feb. 6, 1912.

No Drawing.   Application filed June 8, 1910. Serial No. 565,784.

*To all whom it may concern:*

Be it known that I, JOSEPH L. TURNER, a subject of the Czar of Russia, residing in Philadelphia, county of Philadelphia, State of Pennsylvania, have invented certain Improvements in Processes of Preparing Organic Iodin Compounds, of which the following is a specification.

One object of my invention is to provide a process for the production of an organic iodin compound which shall be of such a nature as to be suitable for ready absorption in the intestinal tract as well as practically unaffected by the gastric juice. As a result, when administered, it will pass through the stomach into the intestinal canal in a substantially unaltered state, where as above noted, it is available for absorption.

In carrying out my process I first treat iodin with a solution of a nucleo-proteid or an albumen and thereafter macerate the product resulting from this action in a formaldehyde solution; finally freeing the resulting product from excess of formaldehyde.

As a typical example of the proportions employed in carrying out my process, I first add twenty (20) pounds of iodin, either as such or in solution, to a solution of fifty (50) pounds of casein. Thereafter I place in a suitable vessel fifty (50) pounds of the above product and to it add eight (8) pints of a forty per-cent. (40%) solution of formaldehyde, allowing the same to stand for two or three days, after which the precipitate is collected on a filter, washed, and dried. The product resulting from the above described process is an iodo-anhydro-methylene proteid containing about twenty per-cent. (20%) of iodin in organic combination. It is a reddish yellow powder practically odorless and tasteless, and when subjected to the influence of alkaline liquids has its iodin split off in the form of an iodid; said product is practically insoluble in acid and neutral liquids and contains about 20% of iodin in organic combination. Not all of this iodin is combined in the same way, for part of it can be split off very readily by treatment with sodium thiosulfate solution. The remaining part, however, is combined very firmly and can be liberated only by the action of concentrated sulfuric acid.

It is to be understood that egg albumen or any other proteid is the equivalent of and may be substituted for the casein in carrying out my invention, and that the proportions noted may be considerably varied without departing from said invention.

I claim:—

1. The process of preparing iodo-anhydro-methylene proteid which consists in acting on a proteid with iodin; subjecting the product of such re-action to the action of formaldehyde; and thereafter separating out the desired product.

2. The process of preparing iodo-anhydro-methylene proteid which consists in acting on fifty (50) pounds of a proteid with twenty (20) pounds of iodin; treating fifty (50) pounds of the product of such re-action with eight (8) pints of a forty per-cent. (40%) solution of formaldehyde; and thereafter separating out the precipitate formed; substantially as described.

In testimony whereof, I have signed my name to this specification, in the presence of two subscribing witnesses.

JOSEPH L. TURNER

Witnesses:
 WILLIAM E. BRADLEY,
 WM. A. BARR.

---

Copies of this patent may be obtained for five cents each, by addressing the "Commissioner of Patents, Washington, D. C."